Sept. 1, 1970  O. FURTER ET AL  3,526,067
BUILDING CONSTRUCTION AND STRUCTURAL ELEMENT THEREFOR
Filed Jan. 30, 1968  11 Sheets-Sheet 6

INVENTORS
OSKAR FURTER
ALDO HENGGELER
BY ROLAND CROTTAZ
HANS SEGHIZZI

Sept. 1, 1970    O. FURTER ET AL    3,526,067
BUILDING CONSTRUCTION AND STRUCTURAL ELEMENT THEREFOR
Filed Jan. 30, 1968                                     11 Sheets-Sheet 7

INVENTORS
OSKAR FURTER
ALDO HENGGELER
BY ROLAND CROTTAZ
HANS SEGHIZZI

Fig. 23

Sept. 1, 1970   O. FURTER ET AL   3,526,067
BUILDING CONSTRUCTION AND STRUCTURAL ELEMENT THEREFOR
Filed Jan. 30, 1968   11 Sheets-Sheet 9

INVENTORS
OSKAR FURTER
ALDO HENGGELER
BY ROLAND CROTTAZ
HANS SEGHIZZI

Sept. 1, 1970 O. FURTER ET AL 3,526,067
BUILDING CONSTRUCTION AND STRUCTURAL ELEMENT THEREFOR
Filed Jan. 30, 1968 11 Sheets-Sheet 11

Fig. 28

INVENTORS
OSKAR FURTER
ALDO HENGGELER
ROLAND CROTTAZ
HANS SEGHIZZI

United States Patent Office 3,526,067
Patented Sept. 1, 1970

3,526,067
BUILDING CONSTRUCTION AND STRUCTURAL ELEMENT THEREFOR
Oskar Furter, Villa Landenberg, Sarnen, Switzerland; Aldo Henggeler, 17 Matthofring, Lucerne, Switzerland; Roland Crottaz, Kernmatt, Hergiswil am See, Switzerland; and Hans Seghizzi, Seestrasse, Meggen, Lucerne, Switzerland
Filed Jan. 30, 1968, Ser. No. 701,707
Claims priority, application Switzerland, Feb. 1, 1967, 1,491/67
Int. Cl. E04h 1/12; E04g 21/14; E04c 3/26
U.S. Cl. 52—79
10 Claims

ABSTRACT OF THE DISCLOSURE

The invention relates to an industrially produced structural element forming a room unit and to buildings erected from such elements. The elements comprise a rectangular or square floor portion and a ceiling portion of the same shape and coextensive with the floor portion. The floor and ceiling portions are spaced at the required distance from each other by light columns placed each at one corner of the floor and ceiling portions and detachably secured to these portions. For erecting a building by means of these elements, any desired number of elements are laterally joined to each other and superposed one above the other. When a plurality of elements are superposed to erect a building having several floors, the light columns supporting the ceiling portion of an element cannot take up the increased charge. Prefabricated heavy concrete or metal pillars will then be placed at certain points between a ceiling portion of a lower element and extend through the recessed floor portion of the superposed element to support the ceiling portion of the superposed element. The ceiling portions can be formed by a grid structure composed of a series of parallel webs extending at right angles to each other. The webs can be provided with recesses to form two series of passages for plumber's and electrician's conduits, or for the provision of prestressing cables.

---

This invention concerns an industrially produced structural element having a rectangular floor portion provided with pillar-like supporting elements carrying a ceiling portion which is congruent with the floor portion.

Known prefabricated structural elements have the drawback of forming very small structural units. Such small units require considerable time for their assembly, and construction methods using such elements are uneconomical.

Other known prefabricated structural elements form bigger units but have the drawback that the architectural design of buildings formed from such elements is extremely limited. All attempts for creating more liberal architectural shapes require the use of a great number of different, prefabricated elements, resulting in an uneconomical construction method. The object of the present invention is the provision of a prefabricated structural element which can be used for producing substantially any desired building in commercially economical manner, while the architectural shaping thereof remains completely free.

According to the present invention, the structural element comprises a rectangular floor portion, detachably mounted supporting columns provided each at one corner of the rectangular floor portion, a rectangular ceiling portion detachably secured to the upper end of said supporting column, said floor portion and said ceiling portion being of congruent shape, the floor portion being formed at least partially as grid girder having parallel webs provided with horizontally aligned recesses forming passages for installation conduits.

The invention also concerns a building which is composed of a plurality of laterally joined and superposed industrially produced structural elements, said elements including a rectangular floor portion, four supporting columns each detachably mounted with its bottom end at one corner of the rectangular floor portion, a rectangular ceiling portion coextensive with said floor portion and detachably secured to the upper end of said supporting columns, and screw means for detachably interconnecting the floor portions and ceiling portions of laterally adjacent structural elements and detachable connecting the ceiling portion of one element to the floor portion of the superposed element.

The invention further comprises a method of erecting buildings from industrially produced structural elements, said elements having rectangular floor panels and rectangular ceiling panels spaced from each other by light supporting columns situated at the corners of said panels and detachably secured to the panels, the floor panels being provided with a recess, said method comprising laterally adjoining and superposing a plurality of structural elements, placing a heavy supporting column on top of a lower structural element in alignment with said recess in the floor panel of the next higher element, supporting the ceiling panel of said higher element on the top of said heavy supporting column, removing said light supporting columns situated between floor and ceiling panels of said next higher element, and detachably securing the floor panel of said higher element to the ceiling panel of the lower element.

The accompanying diagrammatical drawings illustrate by way of example embodiments of structural elements according to the invention and of building erected from the elements.

Figure 1:
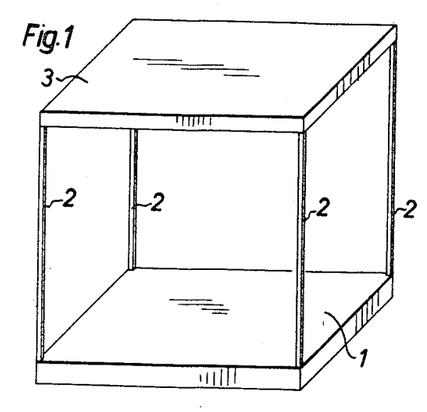
FIG. 1 is an isometric representation of a structural element.

Referring to FIG. 1, the represented structural element or modular unit comprises a square floor portion or member 1 in the form of a rectangular planar structure. A relatively light weight, slender profile upright support column 2 is detachably mounted at each corner of the square floor member 1. The supports 2 preferably are of steel and have a rectangular cross section, the width of a side thereof measuring at least 40 mm. but does not exceed 63 mm. These supports 2 can be hollow or solid. The length of the supports 2 is equal to 255 cm. $+n \times 7.5$ cm., $n=0$ or an integer of positive or negative sign. The determination of these measures is based on a measuring system which will be described later. The four supports 2 carry a ceiling portion or member 3 also of rectangular planar structure and congruent with the floor member 1. The sides of a ceiling portion or a floor portion measures 3 m., but in other embodiments the length of a side can vary between a minimum of 2.4 m. and a maximum of 3.6 m. The preferred normal length is 3 m.

Figure 2:
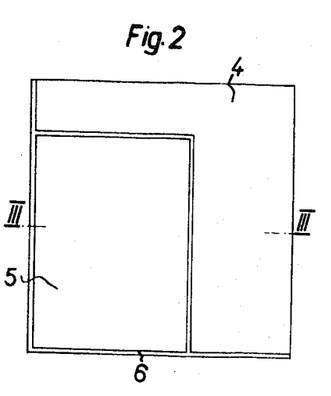
FIG. 2 is a plan view of a ceiling portion of an element.
Figure 3:
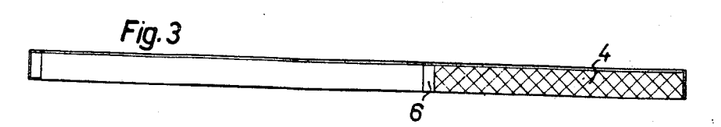
FIG. 3 is a section along the line III—III of FIG. 2, drawn to a larger scale.

FIGS. 2 and 3 show an embodiment of a ceiling portion 3. This ceiling portion comprises a ceiling panel 4 of concrete which can be reinforced or prestressed. The panel 4 has a recess being at 5, surrounded by a metal frame 6. In certain cases, the recess 5 can almost occupy the entire area of the square 3 so that the ceiling portion is reduced to the metal frame 6. In the opposite extreme case, the ceiling panel is not recessed, so that no metal frame is required, the ceiling portion then being formed by a square concrete panel only. The ceiling portion can also be made of sheet steel which may be lined with panels of filling material.

Figure 24:
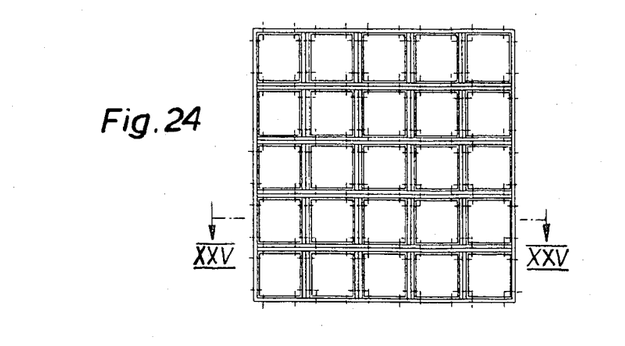
FIG. 24 is a plan view showing another embodiment of a ceiling portion of an element.
Figure 25:
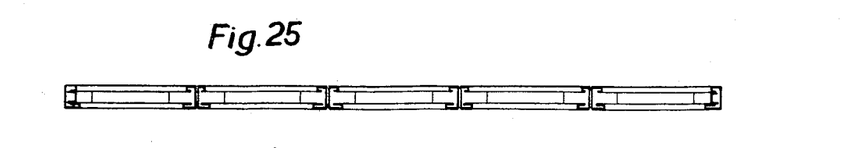
FIG. 25 is a section along the line XXV—XXV of FIG. 24.

FIGS. 24 and 25 show an embodiment of a ceiling plate formed by sheet steel frame elements.

Figure 4:
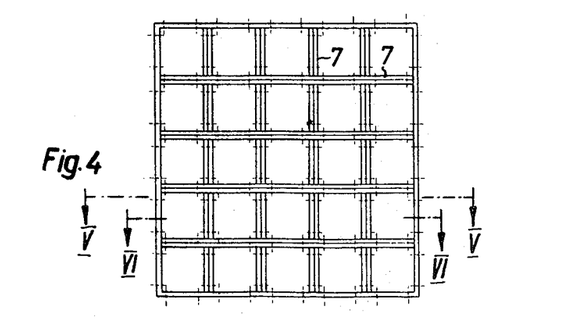
FIG. 4 is a plan view of a floor portion of an element.
Figure 5:
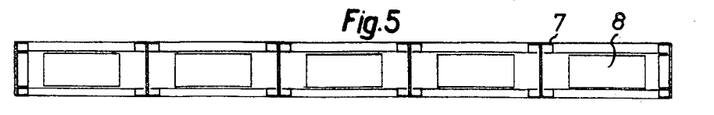
FIG. 5 is a section along the line V—V in FIG. 4, drawn to a larger scale.
Figure 6:
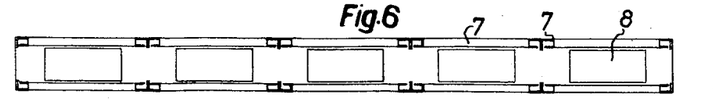
FIG. 6 is a section along the line VI—VI of FIG. 4.

FIGS. 4, 5 and 6 show an embodiment of a floor portion 1 which is formed as a grid structure of sheet steel and forms a floor panel. The individual cells of this structure are made of rigidly connected double walls 7 of steel girders of U-section.

Each double wall 7 defining a cell is provided with a rectangular recess 8, the recesses in the parallel double walls being aligned with each other, so that two series of parallel passages extend at right angles to each other in horizontal direction through the floor panel. Besides a decrease in weight obtained by the recesses 8, the passages so formed serve for receiving the horizontally extending plumber's fittings, electrical wiring and other installation conduits.

Figure 7:
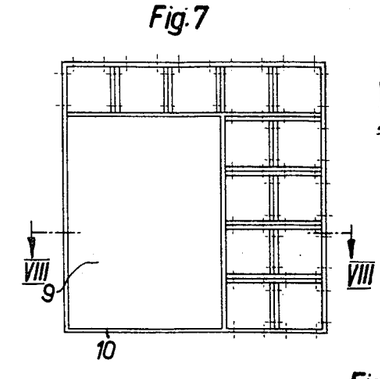
FIG. 7 is a plan view of another embodiment of the floor portion of a structural element.
Figure 8:
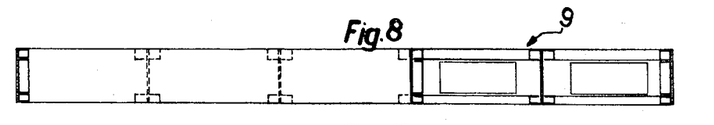
FIG. 8 is a section along the line VIII—VIII of FIG. 7, drawn to a larger scale.

FIGS. 7 and 8 represent another embodiment of the floor portion which is also formed as a grid girder of sheet steel and is provided with a recess 9 defined by a frame 10. The construction of the grid cells corresponds to that of FIGS. 4 to 6.

Figure 9:
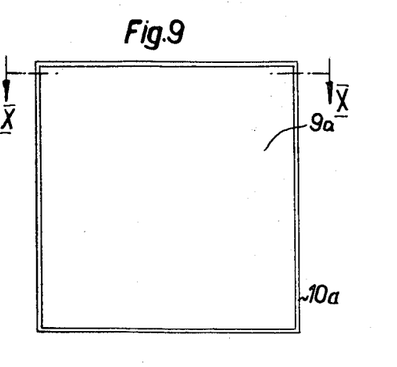
FIG. 9 is a plan view of still another embodiment of a floor portion.
Figure 10:
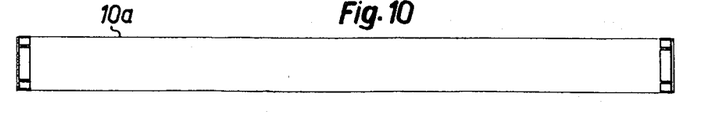
FIG. 10 is a section along the line X—X in FIG. 9, drawn to larger scale.

The embodiment of the floor portion shown in FIGS. 9 and 10 is provided with a recess 9a extending over the entire area of the portion which latter is composed only of the frame member 10a.

Figure 11:
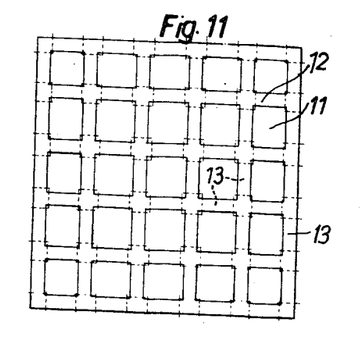
FIG. 11 is a further embodiment of a floor portion of a structural element, shown in plan view.
Figure 12:
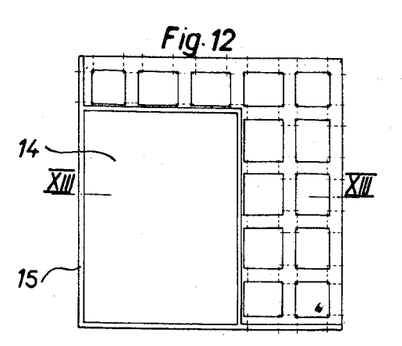
FIG. 12 is another embodiment of a floor portion, shown in plan view.
Figure 13:
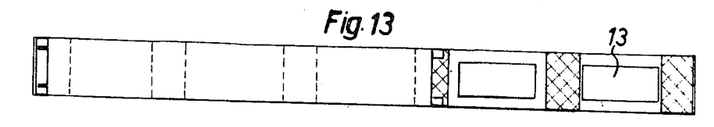
FIG. 13 is a section along the line XIII—XIII of FIG. 12, drawn to a larger scale.

FIGS. 11 to 13 represent two embodiments of a floor portion of an element. According to FIG. 11, the floor portion forms a floor panel constructed as a grid in reinforced concrete having cells 11. Each cell wall 12 is provided with a recess 13. The recesses 13 in parallel walls 12 are aligned with each other, so that two series of parallel passages extending at right angles to each other are formed within the floor panel, these passages having the same purpose as the passages formed by the recesses 8 in FIGS. 4, 5 and 6.

FIGS. 12 and 13 show a floor panel having a recess 14 defined by a metal frame 15. The grid forming part of the panel is constructed similar to that of FIG. 11. The panel could also be reduced to the frame 15 without any grid structure within the frame, similar to the embodiment of FIGS. 9 and 10.

Figure 14:
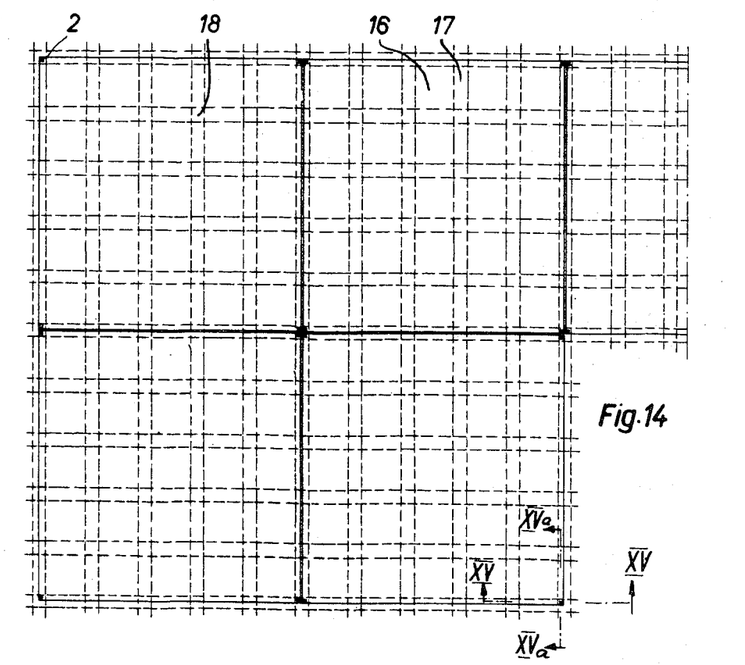
FIG. 14 is a plan view, a plurality of superposed and laterally joined elements.

The structural elements which have been described serve for erecting buildings the plan of which, for establishing the internal construction, is divided according to FIG. 14 by means of a usual band grid into square unit areas 16 of a lateral length of 45 cm. These areas are defined by intersecting bands 17 having a width of 15 cm. This width is a result of the experience that prefabricated elements mostly have a wall thickness of 15 cm. In order to provide for other wall thicknesses, the grid can also be established on the base of band widths of 10, 12 or 20 cm., which will result in a change of the dimensions of the unit areas. The lateral length of the square unit areas is based on the consideration that the linear extension of the human movement space is 60 cm. This length is equal to the length of a unit area plus the width of the band of the grid. According to FIG. 14, the structural elements are inserted into the band grid and removably attached to each other in such manner, that the supports 2 or the elements will be situated entirely within the area of the nodal points of the intersecting bands 17.

Figure 15:
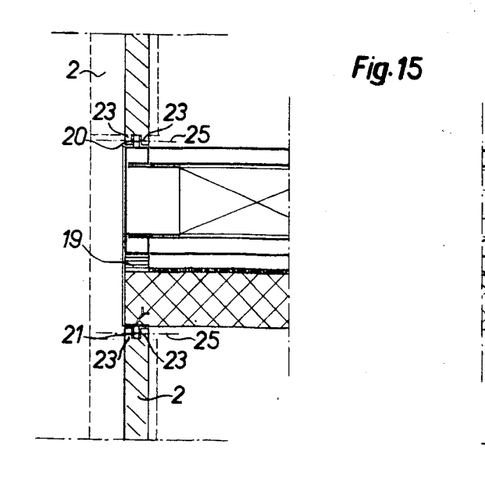
FIG. 15 shows two fragmentary sectional views, one taken along the line XV—XV, and the other along the line XVa—XVa of FIG. 14.
Figure 15A:
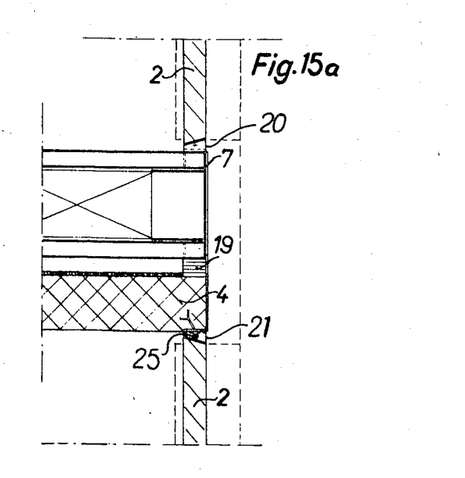

This expedient is substantially novel since originally the consruction grid for the load bearing parts was not allowed to intersect the nodal points of the grid for the non bearing completion or finishing parts, in order to avoid a coincidence of non bearing or curtain walls with the supporting or load bearing members. In the present construction, in spite of this superposition of construction grid and finishing or band grid, no special finishing elements are required, as it will be understood from the following. When the described structural elements are superposed fort erecting the different floors of the building, a neoprene bearing 19 is placed on the ceiling panel 4 of the lower structural element (FIG. 15). The floor panel of the upper element rests on this bearing. A pawl 20 is arranged a each corner of the floor panel of the upper structural element. This pawl penetrates between two jaws 2 formed at the lower end of the support 2. A bolt indicated at 25 interlocks the support 2 with the base plate. The upper end of the support 2 also forms two jaws 23 between which engages a pawl 21 secured to the upper floor panel. A bolt indicated at 25 interlocks the support 2 with the ceiling panel 4.

As soon as more than four of the described structural elements are superposed, the light supports 2 of the lowermost of the elements are no longer capable of supporting the weight of the upper elements. For this reason, additional supporting members will be used for the lower elements. The subsequent positioning of the additional supporting elements in accordance with the actual load offers the advantage that it will not be necessary to over-dimension a great number of the industrilly prefabricated elements in view of possible peak loads to which some of the elements only may be subjected.

Figure 16:
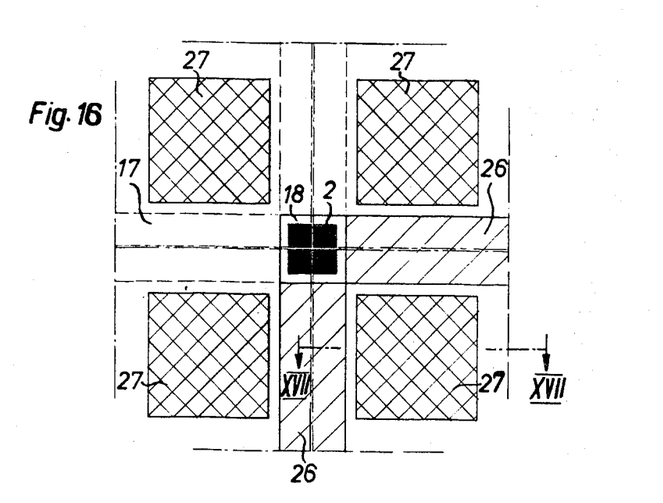
FIG. 16 is a detail plan view of a supporting area of an element produced with additional supports.

According to FIG. 16, the original steel supports 2 remain at their place at a nodal point of two bands 17. Additional support columns 27 of relatively heavy weight and massive profile, and made of concrete or of steel are arranged outside of the bands 17. The lateral length of these additional supports is at least 125 mm. but does not exceed 400 mm. These heavy supports are so arranged, each within a one-unit area, so as not to interfere with the bands 17 of the finishing grid. This arrangement of supports 2 and 27 renders possible the insertion of uniform non bearing wall elements 26, so that special structures which are to be individually adapted, are not required, though the nodal points of the construction grid and the finishing grid coincide. Particularly the wall elements, since they are non bearing, can be arranged or rearranged subsequently in any desired manner, the fact again being advantageous that no individual executions are required. In this manner unlimited possibilities for erecting the finishing structures are obtained, and also plumber's and electrician's conduits can be subsequently rearranged.

Figure 17:
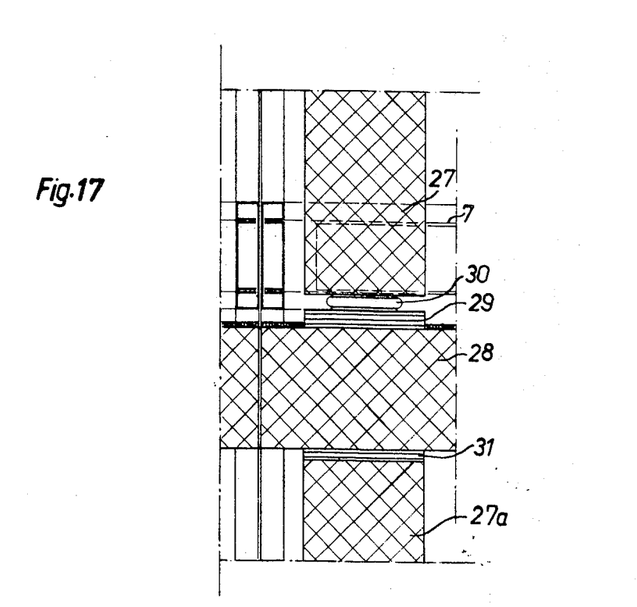
FIG. 17 is a section along line XVII—XVII of FIG. 16.

FIG. 17 represents a vertical detailed section of an additionally supported ceiling panel 28. A neoprene bearing 29 is placed on the panel 28 and supports a "Freyssinet" type flat press 30 of adjustable height. A support 27 is placed on the press 30. The upper end face of the support 27 (as shown for the lower support 27a) carries a second neoprene bearing 31 which abuts against the upper ceiling panel 28. The flat press 30 serves to individually adjust the supporting level of the supports 27. After adjustment of the supporting level, the steel supports 2 may be removed, if desired.

Figure 18:
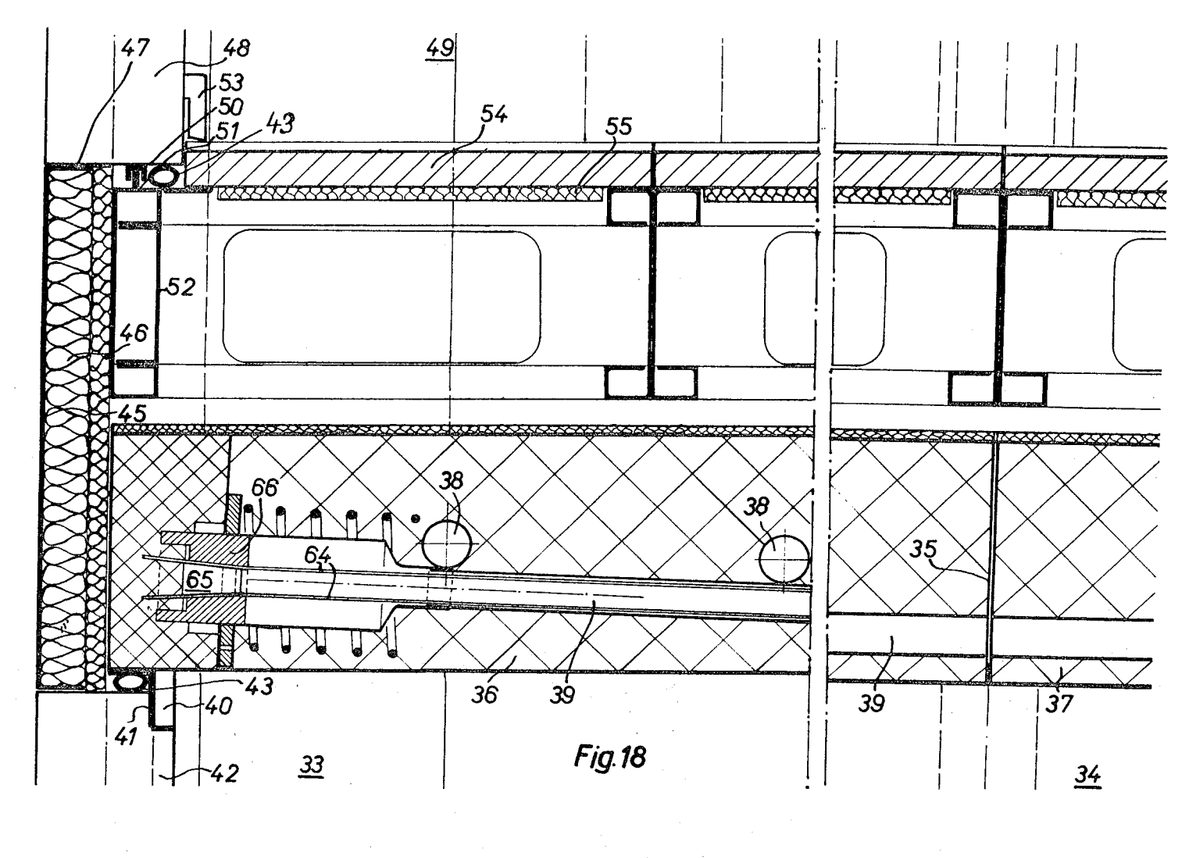
FIG. 18 is a transverse section through a pretensioned ceiling plate and a superposed floor plate, and joining outer wall portions of two superposed structural elements.

FIG. 18 illustrates the horizontal joining of two structural elements 33 and 34, the light steel supports adjacent the joint 35 between the two elements having been removed for architectural reasons, while additional heavy supports for providing sufficient supporting forces are arranged at other places. Instead of ceiling panels according to FIG. 2, the two elements 33 and 34 are provided with heavy ceiling plates 36 and 37. These ceiling plates are provided with a series of substantially horizontally extending parallel tube shaped ducts or passages 38 and with a series of substantially horizontally extending parallel ducts 39 directed at right angles to the ducts 38. For reasons of structural statics, the ducts 28 and 39 are slightly rising towards the supported sides of the panels. Pretensioning cables 64 are passed through these ducts, and are tensioned and anchored by means of locking members 65 in sleeves 66. In the region of the supported sides, the cables can be provided with coupling members. Owing to prestressing of a group of ceiling panels in both supporting directions by means of the cables 64, a supporting surface is obtained. The friction coefficient is deliberately increased at the abutting faces of the joints 35, so that the absorption of occurring shearing stresses is ensured. Angle irons 41 are arranged at the lower side of the ceiling panels 36 and engage a recess in an outer wall element 42 with which the corresponding angle iron is rigidly connected. A sealing member 43 is provided for sealing the joint between the ceiling panel 36 and the outer wall element 42. A covering panel 45 filled with insulating material 46 is secured to the outer end faces of the floor panel 52 and the ceiling panel 36. This covering panel fills the not covered half of the band grid. An outer wall element 48 is inserted into a structural element 49 arranged above the structural element 33 and is supported on the floor panel 52 of this element 49. For this reason channel iron lengths 50 are secured to the lower bearing surface of the outer wall element 48 and a pawl 51 engages between the legs of the channel iron. The pawl 51 is secured to the floor panel 52 of the element 49 and serves to laterally maintain the wall element 48. A sealing member 43 is inserted between the floor plate 52 and the outer wall element 48. The floor panel 52 is provided with a floor covering 54 maintained thereon by means of brackets 53; the lower side of the floor covering is formed by a layer of insulating material 55.

It is understood that the described structural elements can be added together in any number in horizontal and vertical directions. Particularly it is possible to subsequently add further elements to an assembly of such elements; it may then become necessary to provide additional heavy supports. It is likewise possible to subsequently remove single elements from an erected building. Such removed elements can be used again for erection of other buildings, since their removal from a building does not damage the building or the removed elements. Unlimited possibilities of arranging the described elements in the erection of buildings are obtained.

Figure 19:
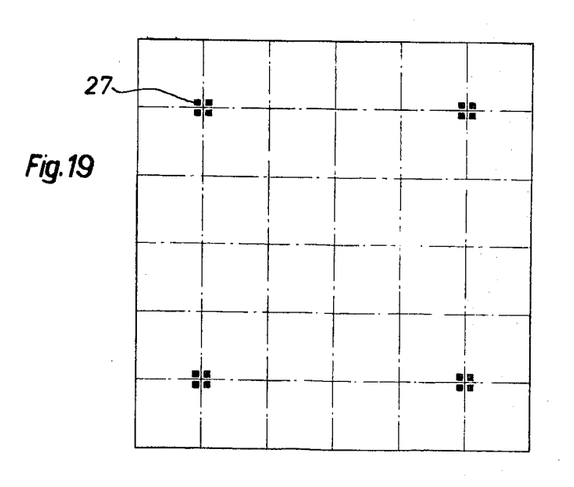
FIG. 19 is a diagrammatical representation in plan view of horizontally joined elements.

FIG. 19 diagrammatically represents a combination of thirty-six structural elements as described, having ceiling panels of prestressed concrete, there being provided only four supporting points. Four concrete pillars 27 are provided at each of the four supporting points, in order to ensure sufficient carrying capacity, and all steel supports (2 in FIG. 1) have been removed. The span between the supporting points corresponds to the length of four structural elements joined to each other.

Figure 20:
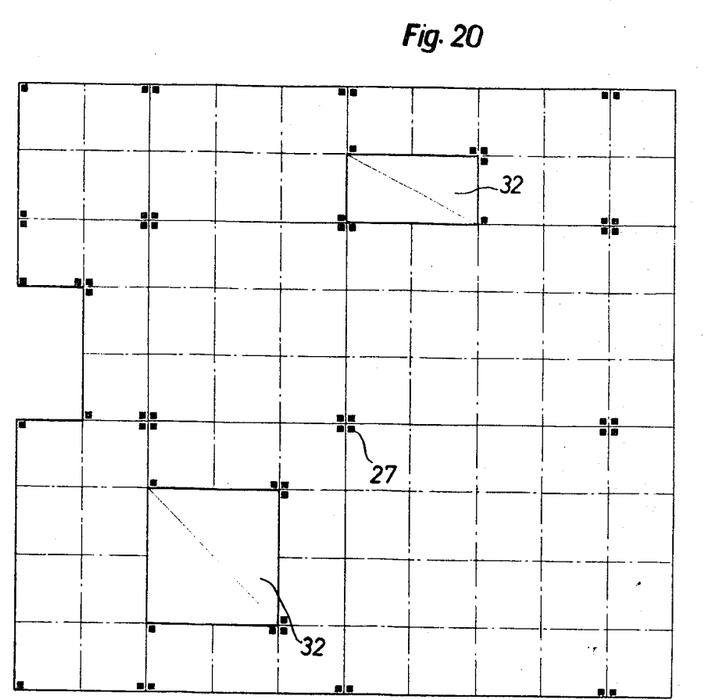
FIG. 20 is a plan view of another assembly of joined structural elements.

FIG. 20 diagrammatically illustrates the horizontal joining of a number of structural elements having prestressed ceiling panels and an individual arrangement of concrete supporting pillars 27, of empty areas or recesses 32, as they will be required for example for elevator shafts, and of reentering or projecting corners. All steel supports 2 have been removed.

Figure 21:
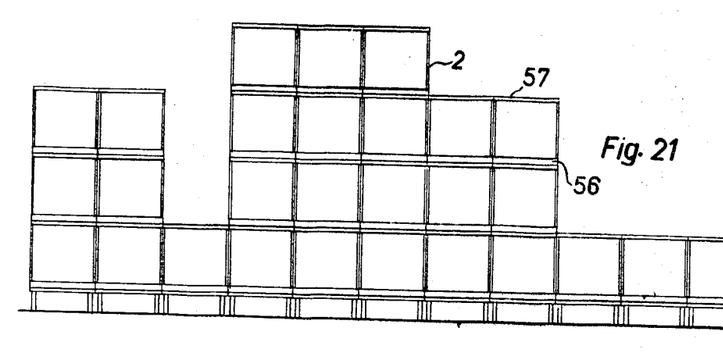
FIG. 21 is a sectional view of a building composed of structural elements according to the invention.

FIG. 21 represents a building erected by means of the described structural elements, without the use of additional concrete supports or of prestressed ceiling panels. Each structural element accordingly comprises a floor panel 56, four steel supports 2 and a light ceiling panel 57, as described with reference to FIGS. 2 and 3.

Figure 22:
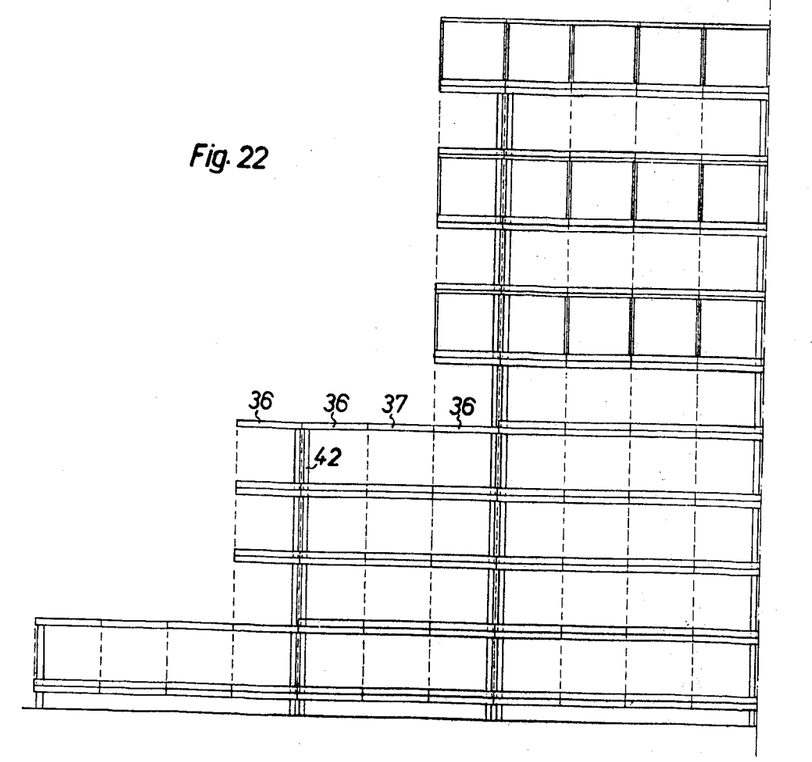
FIG. 22 is a sectional view of another building made by elements according to the invention.

The building according to FIG. 22 is exclusively erected in the manner described with reference to FIG. 18. The ceiling panels 36 and 37 are prestressed by cables as shown in FIG. 18. The surface structures thus formed are carried by additional concrete supports 42, the distance between the supporting points being an integral multiple of the structural parts.

Conventionally produced constructions, such as elevator shafts, staircases, etc. offer stability of such constructions produced by the described elements against horizontally acting forces, while other shafts can be provided to receive the vertical plumber's and electrician's conduits.

Figure 23:
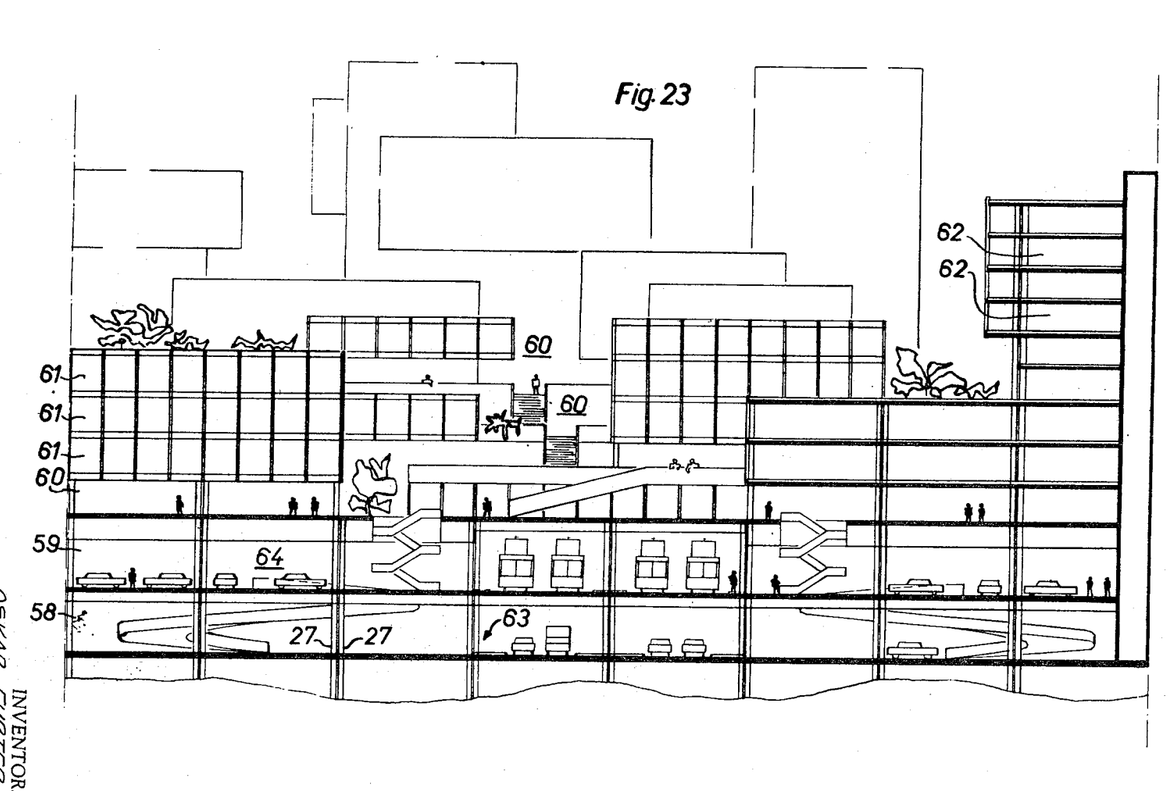
FIG. 23 represents a section through an entire city block, partly shown in elevation.

FIG. 23 represents an entire section of a city erected from the described structural elements. Private traffic is moving on the plane 58. The width of a unit section 63 between supports 27 is 12 m., corresponding to the length of four structural elements placed side by side. This distribution of supports enables the formation of traffic lanes capable of taking up the traffic of a city, the traffic lanes may describe curves of 90° along which trucks with trailers may move without difficulties. A traffic plane 59 is at the disposition of public traffic and offers parking space 64. The planes reserved to pedestrians are designated by 60, and stores, shops and offices are located on planes 61, while apartments are situated on planes 62. The group of buildings, once erected, can be completed or modified later-on in any desired manner.

Figure 26:
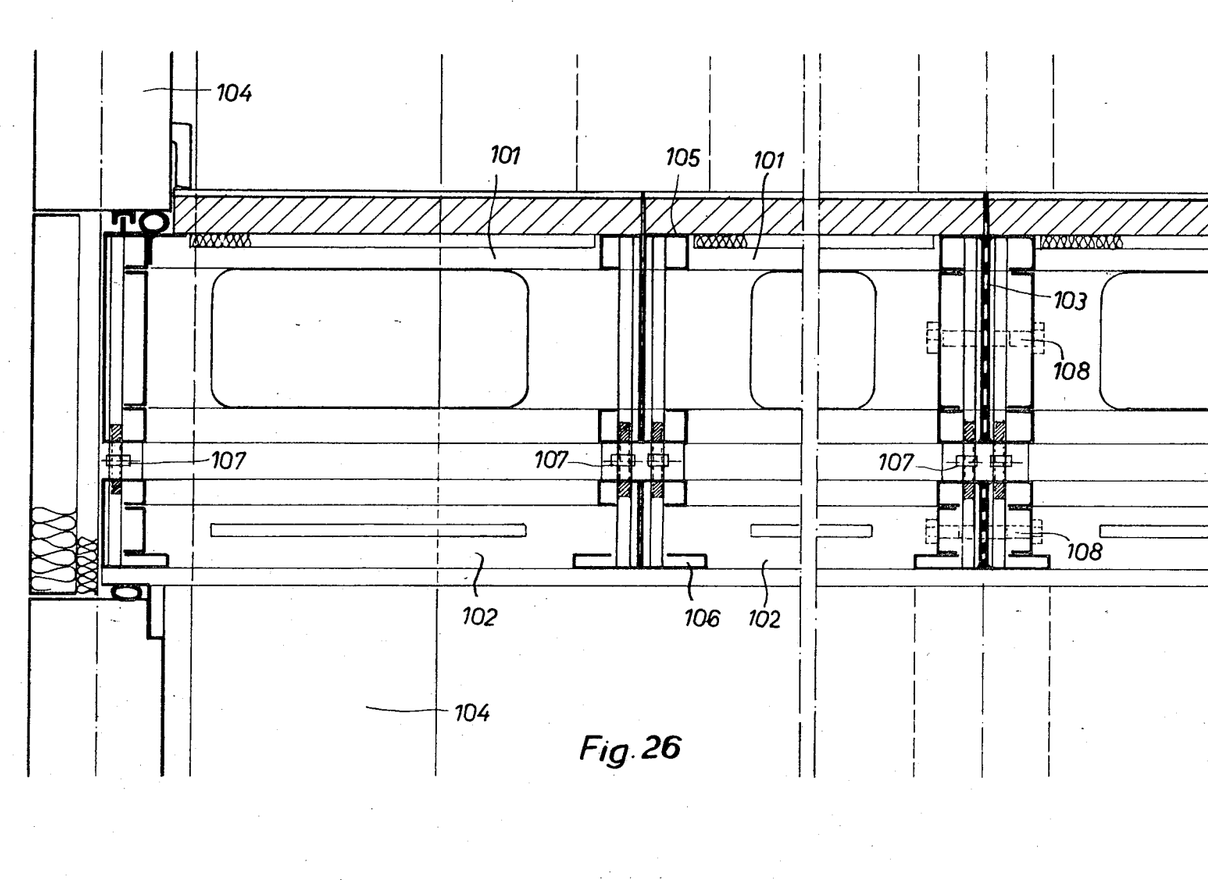
FIG. 26 is a transverse section through floor and ceiling plates assembled with shear-proof connection means.

FIG. 26 represents the horizontal joining of two superposed structural elements 101 and 102. At the vertical joint between the elements 101 and the elements 102 the removable supports have been omitted for architectural reasons, while on other places heavy supports 104 are provided. In order to ensure sufficient load carrying capacity, the floor panels 105 and ceiling panels 106 are constructed as sheet steel grid girders according to FIG. 4 and are connected to each other by screws 107 and 108 to withstand shearing stress. Neoprene sealing material 103 may be inserted between adjacent floor and ceiling panels as sound insulation.

Figure 27:
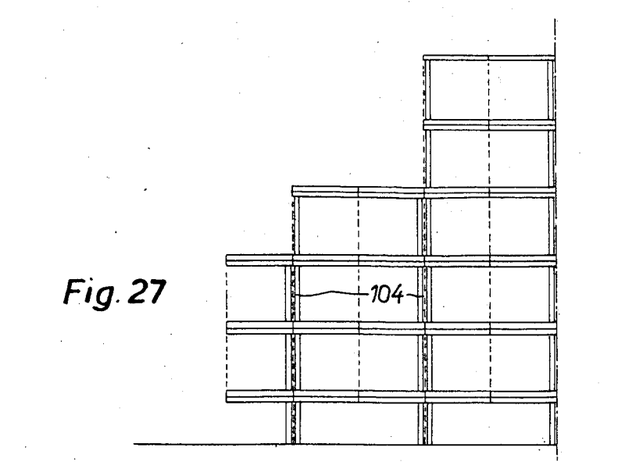
FIG. 27 is a sectional view of a building made with structural elements according to the invention.
Figure 28:
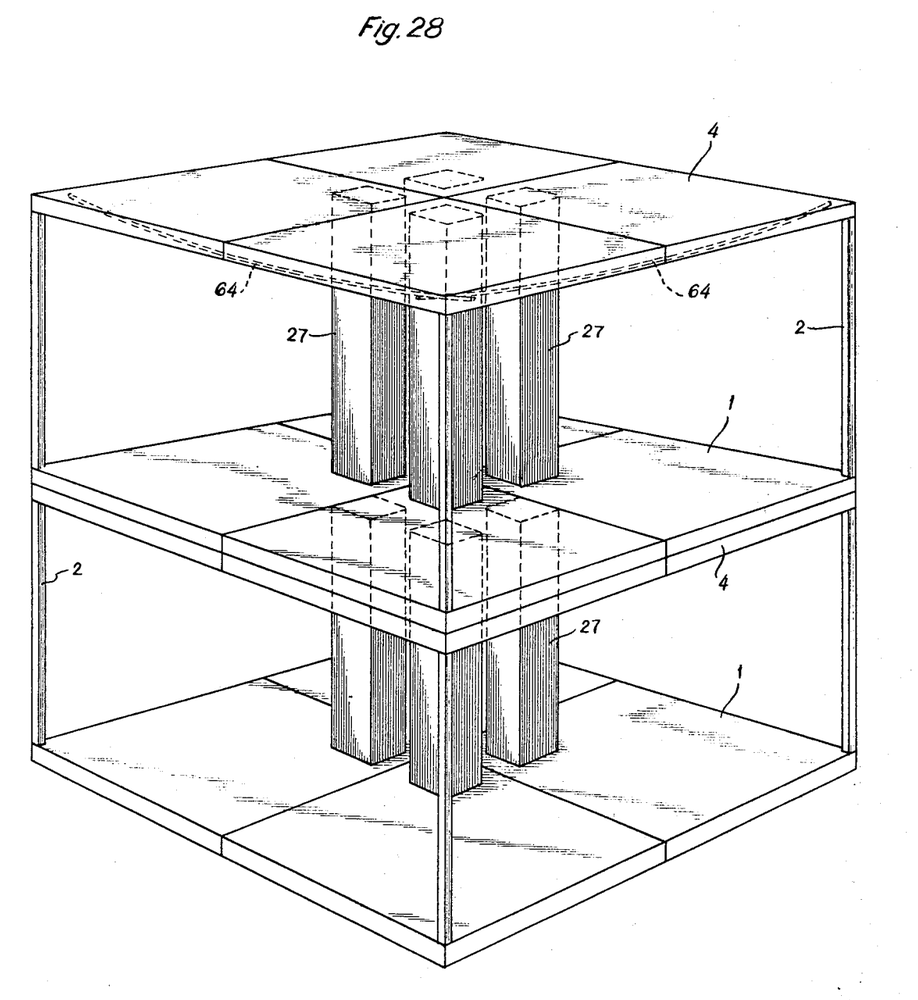
FIG. 28 is a perspective view of a portion of a building made with modular units according to the invention.

FIG. 27 represents a section through a building which has been erected as explained with reference to FIG. 26.

The floor and ceiling panels of adjacent and superposed elements have been screwed together after erection, and the horizontal surface girders thus formed are supported by additional concrete supports 104, the distance between the supporting points being an integral multiple of the structural elements.

The formation of the described structural elements, of the finishing and construction grids, and of all finishing elements such as walls, built-in boxes or cabinets and the like, which are used in buildings erected from the structural elements, is effected according to a predetermined system of measurements known per se.

This system is based, on the one hand, on the spacing ratio of the medial or golden section (sectio aurea), which can only be determined by approximative values. These values are based on the recurrence formula $$Y_{(K+1)} = \frac{1}{Y_{K+1}}$$

The basic measures on which this measuring series are based, are, on the one hand, the Egyptian L of 45 cm. a man measuring in the average four L's, a foot of 30 cm., and the span of 7.5 cm., and on the other hand, a chosen room height of 2.55 m. This height corresponds to the height of a man with raised arms, plus one foot, that is 30 cm. These chosen measuring values result in a new unit of a measuring series which is the span of 7.5 cm.

The sequence of the approximate values of the golden section is $$1, \frac{1}{2}, \frac{2}{3}, \frac{3}{5}, \frac{5}{8} \cdots \text{etc. } 1, 2, 3, 5, 8, 13, 21 \ldots$$

and the measuring system series accordingly is $$7.5, \frac{7.5}{.5}, \frac{15}{22.5}, \frac{22.5}{37.5} \cdots \text{etc.}$$

From this series result the following approximate values for this measuring system:

7.5, 15, 22.5, 37.5 . . . etc.

These values and summations of these values now determine the measurements of the described structural elements, of the grids and of the finishing elements of the buildings erected from these elements.

We claim:
1. A building comprising a plurality of preformed modular units superposed vertically and abutting horizontally, each unit comprising a pair of spaced, parallel congruent rectangular planar structures forming floor and ceiling members thereof, two distinct types of supporting columns extending between at least some of said planar structures, one type of said column being of relatively light weight and slender profile and the other type being of relatively heavy weight and massive profile, said relatively light supporting columns being removably mounted between said rectangular planar floor and ceiling structures of some of said modular units at predetermined corners thereof, one of said planar rectangular structures of one of said modular units having an opening therein for receiving therethrough said relatively heavy supporting column, a relatively heavy supporting column passing through said opening and being supported between the adjacent rectangular planar structure of the next vertically adjacent modular unit and the other rectangular planar structure of said one modular unit, and means attaching said horizontally abutting modular units to each other.

2. A building according to claim 1 wherein said rectangular planar structures are at least partially formed as a grid girder having parallel webs provided with horizontally aligned passage openings for receiving installation conduits.

3. A building according to claim 2 wherein the rectangular planar structures forming the ceiling member of said horizontally adjacent modular units comprise generally aligned horizontal tube-shaped passages therein, and said attaching means comprises a pretensioning cable disposed within said passage and having its respective ends fastened to ceiling members at opposite extreme regions thereof which are adjacent said supporting columns, so that a plurality of horizontally adjacent ceiling members may be joined and supported vertically solely by said cable free of supporting columns.

4. A building according to claim 1 wherein a height adjustable flat press receives the lower end of said heavy supporting column.

5. A building according to claim 1 wherein the lengths of the sides of the rectangular floor and ceiling members are dimensioned according to values, multiplied with a predetermined length, of the sequence of approximate values of the golden section ratio and with sums of said values.

6. A building according to claim 5 wherein said predetermined length is 7.5 cm.

7. A building according to claim 1 wherein a plurality of said relatively heavy columns is provided and defines a construction grid and wherein room units are provided by internal non-bearing walls supported by said relatively light supporting columns, said walls between adjacent modular units forming a finishing band grid, the nodal points of said construction grid being coincident with the nodal points of said band grid, said relatively light supporting columns being positioned within nodal points of said band grid and said relatively heavy supporting columns being positioned outside the walls of said band grid.

8. A method of erecting a building from industrially produced structural units comprising the steps of providing a plurality of vertically superposed and horizontally abutting modular units each comprising a pair of spaced parallel congruent rectangular planar structures defining a floor and a ceiling and connected by relatively light weight and slender profile supporting columns extending vertically between their respective corners, one of said planar structures of one of said modular units having an opening for receiving a relatively heavy weight and massive profile supporting column,
attaching each of said modular units to the respective horizontally abutting units,
inserting a relatively heavy weight and massive profile supporting column passing through said opening and extending between the adjacent rectangular planar structure of the next vertically adjacent modular unit and the corresponding rectangular planar structure of said one modular unit, and
removing selected ones of said relatively light weight supporting columns to form areas larger than one modular unit free of vertical supports.

9. A method according to claim 8 wherein said opening is disposed within the floor of said one structural unit and wherein the step of inserting a heavy supporting column includes placing said column on top of the ceiling of the lower adjacent structural unit in alignment with said opening in the floor of said one unit, and supporting the ceiling of said one unit on top of said heavy supporting column.

10. A method according to claim 8 wherein the ceiling structures of laterally joined units are provided with substantially horizontal openings extending perpendicularly to each other, the openings of each unit being aligned with the corresponding openings in the adjacent lateral units, said method further comprising the step of introducing pretensioning cables through said openings of a plurality of ceiling structures of adjacent units prior to removing at least some of said light supporting columns disposed at the corners of said units.

References Cited

UNITED STATES PATENTS

| | | | |
|---|---|---|---|
| 2,222,037 | 11/1940 | Lafferty | 52—745 |
| 3,103,709 | 9/1963 | Bolt | 52—126 |
| 3,201,502 | 8/1965 | Pluckebaum | 52—745 |
| 3,225,434 | 12/1965 | Van der Lely | 52—79 |
| 3,377,755 | 4/1968 | Stacky | 52—236 |
| 3,152,421 | 10/1964 | Middendorf | 52—223 |
| 3,367,063 | 2/1968 | Bondsen | 52—228 |

FOREIGN PATENTS

| | | |
|---|---|---|
| 753,001 | 2/1967 | Canada. |
| 778,542 | 2/1968 | Canada. |
| 1,371,438 | 7/1964 | France. |
| 1,098,003 | 1/1968 | Great Britain. |
| 1,082,035 | 5/1960 | Germany. |
| 138,865 | 10/1950 | Australia. |
| 680,117 | 7/1965 | Italy. |

HENRY C. SUTHERLAND, Primary Examiner

U.S. Cl. X.R.

52—127, 236, 745, 747